Nov. 25, 1930.   H. CHAPPUZEAU ET AL   1,782,462
ARRANGEMENT FOR TESTING MAGNETIZABLE OBJECTS
Filed June 26, 1926    2 Sheets-Sheet 2
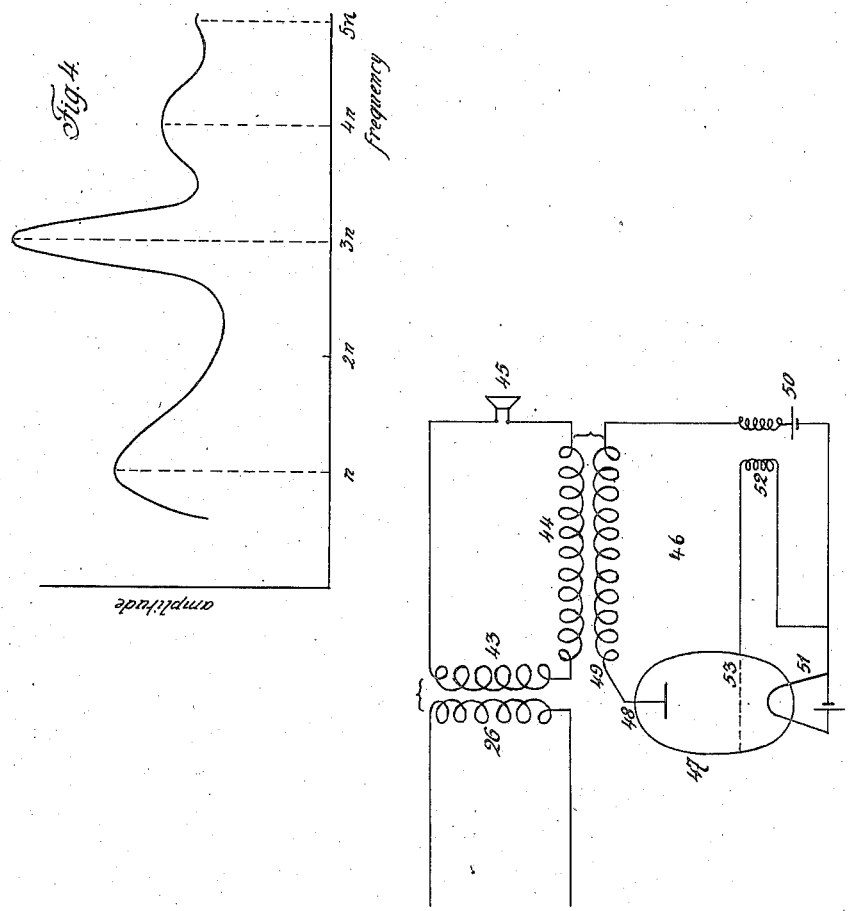
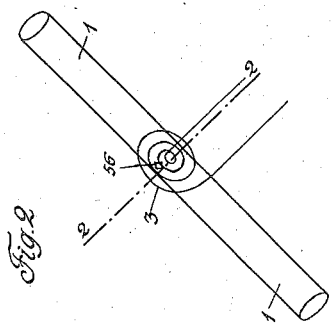
Inventors
Helmut Chappuzeau, +
Otto Emersleben
by Knight Bro
Attorney Patented Nov. 25, 1930

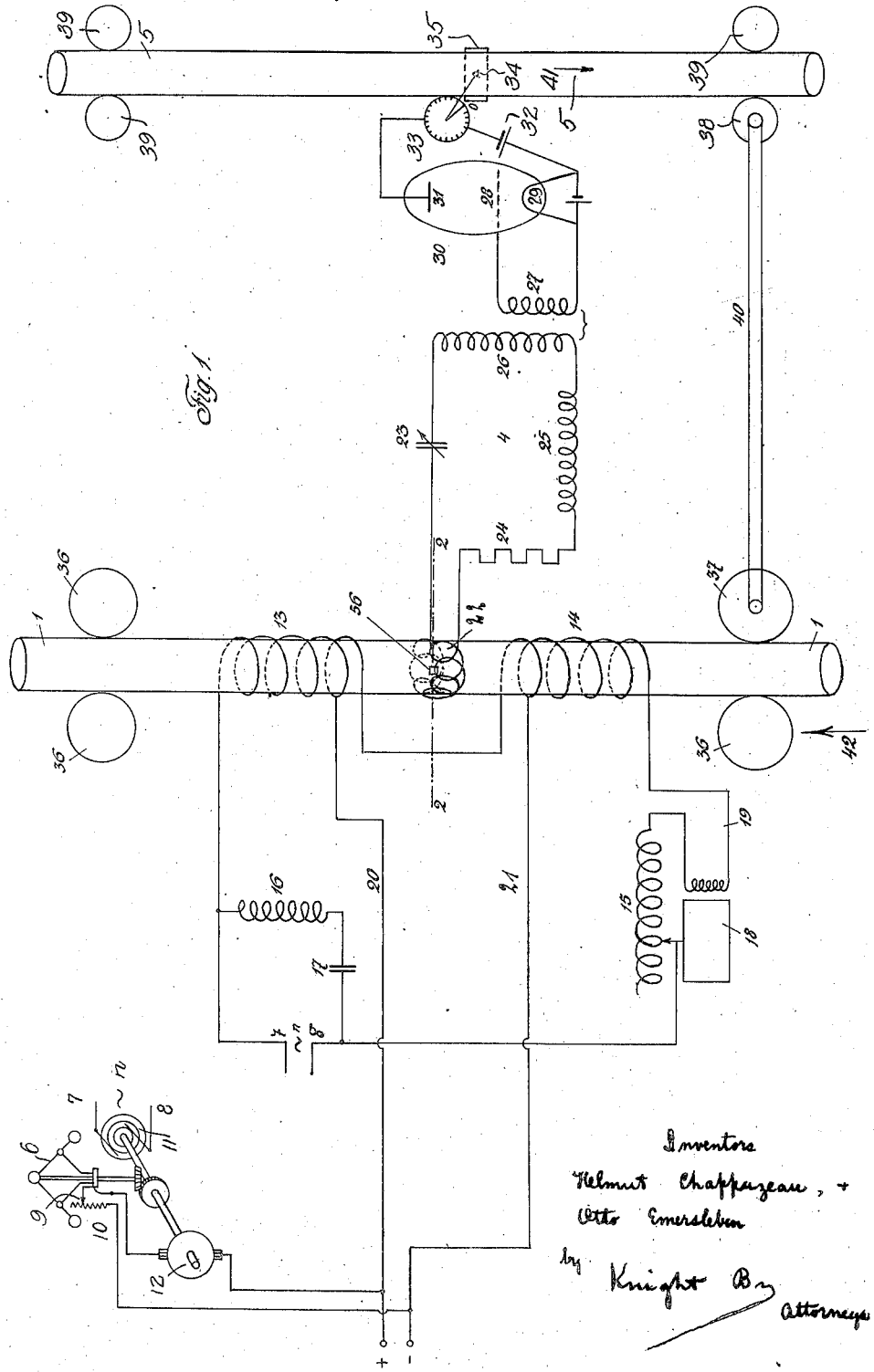

1,782,462

UNITED STATES PATENT OFFICE

HELMUT CHAPPUZEAU AND OTTO EMERSLEBEN, OF KIEL, GERMANY, ASSIGNORS TO THE FIRM NEUFELDT & KUHNKE BETRIEBSGESELLSCHAFT M. B. H., OF KIEL GERMANY

ARRANGEMENT FOR TESTING MAGNETIZABLE OBJECTS

Application filed June 26, 1926, Serial No. 188,752, and in Germany July 6, 1925.

Our invention relates to an arrangement for testing magnetizable objects. It is principally applicable for testing long objects of iron, steel or other magnetizable metals, such as rails, metal cables, wires, metal tubes.

In order to explain the invention itself and its differences from the prior art, we may first assume that our invention shall be employed to examine a long rectilinear body of magnetizable material of cylindrical form as to the properties of the inner material, more especially, the defects of its interior. Our invention is well able to ascertain inner defects of the object to be tested (e. g. a wire cable), it has also been employed for ascertaining whether the outer layers of a cable have structural defects, not visible to the eye, and it is as well applicable for the examination of the interior of the cable. It is, for example, possible with our method to ascertain whether single strands in the interior of the cable are broken, or even whether they have become so thin by long use that they will shortly break. Our method can be applied without unwinding the cable, and it also serves for ascertaining defects of the inner strands of the cable not visible to the eye, even if the cable has been unwound. With our method places in the material can be found, which in some way or other differ in their properties from the surrounding material. It is, for example, possible that in the construction of a cable foreign particles or not completely homogeneous material may be bedded in the wire, which are not at all visible to the eye. Such places of the cable greatly endanger the safety of the cable. We assume, for example, that in one wire a small piece of brittle material is embedded. If the cable is now strained, it becomes thinner and its section alters. In a sound cable portion the sectional change generally takes place uniformly, whereas, at the brittle defective place the section cannot decrease uniformly, because the strand in question will not stretch to the same degree as the other strands, and the greater portion of the strain exerted on the cable consequently acts on that strand and it soon tears apart. This brittle unstretched portion of this one strand has, however, during the stressing pressed for instance on the six surrounding neighboring strands which will then on account of the excessive local strain, shortly break. After 7 strands of a cable thus have broken at one place, only small causes are necessary to rupture the whole cable at this point. This is the reason why comparatively new hoisting cables frequently break from apparently unknown causes.

Our invention refers to a method by means of which any point of an elongated element, such as a cable can be examined as to its condition, and its faults be positively located not only longitudinally but also transversely of the cable. This is in contradistinction to and an improvement over prior art methods, in which latter the defective point, if found at all, cannot be absolutely determined but only comparatively, namely to the extent of showing that the faulty portion is "different" in general from the rest.

The prior art disadvantages are removed by our invention. It is only necessary to place the coil against the place which is to be examined as to defectiveness and according to our invention it can be ascertained whether this place is defective or good. For this purpose the assumed cylindrical test body can, for example, be longitudinally magnetized. As long as the object to be tested is cylindrical and of homogeneous material, the magnetic field does not possess at any point a component at right angles to the magnetization direction—i. e. a transverse component, which with a cylindrical form would be a radial component. According to the invention transverse components are now measured. A deviation in the material from the normal must be exactly at the place where the transverse component appears. The transverse component may be measured with a coil, the plane of which lies in parallel to the magnetizing direction, i. e. in parallel to the cylinder axis. By taking a flat coil, arranged at a tangent to the cylinder the possibly existing radial component can be measured in the direction of the radius at right angles to it. If, however, several such flat-coils are connected so as to surround the cylinder like a cuff (but in such a way that the plane of the individual windings of the coil runs in parallel to the axis of the cylinder) a certain section of the cylinder is tested. Inductions occur according to our invention, if in the section in question the magnetizable material is interrupted (either through air or a foreign body) or if such properties as will generally accompany the magnetic properties greatly vary from normal.

Of course several sections may be successively measured in this manner by shifting the test apparatus relatively to the object to be tested. Our method remains nevertheless different from those of the known arrangements, as in our case for measuring a single section only one adjustment of our apparatus is required. If in the correctly adjusted apparatus a current is observed, which is caused by induction actions of a transverse component, the existence of a defect is hereby proven; if, however, the current in the induction coil is naught, the material is faultless. In the known arrangements, on the contrary, for good material some undetermined indication is given so that the known measuring methods are only relative and not absolute.

Our invention is, however, not restricted to cylindrically symmetrical bodies assumed here as examples, but it can be generally employed for bodies with helical symmetry. If the section is not circular, every other sectional form can always be generally examined, but not a certain radius of such a section.

A magnetization of a body can, according to our invention, generally be undertaken in any direction, whereby that component which according to the geometrical form of the body to be tested should ordinarily disappear, is measured. If it really disappears, the body is homogenous at every point of the transverse section, if it does not disappear, the section in question is defective. In cylindrically shaped bodies with longitudinal magnetization that component which must disappear for complete homogeneity of the material, is the transverse component.

In such a cylindrical body magnetized longitudinally this magnetization can be attained by energizing a coil preferably a rigid one, the axis of which coincides with the cylinder axis, by means of a suitable electric current, so that the generated electro-magnetic field can be altered simultaneously with the current. It is advisable to separate the magnetizing coil into two symmetrical portions arranged symmetrically with respect to a transverse plane through the body so that the section to be examined falls in this plane of symmetry.

Continuous or preferably alternating current is employed as magnetizing current. Alternating current permits a greater number of variation possibilities (besides the maximum value of the current intensity, there may be changed the frequency and the flow of the current in each period), so that, with the help of alternating current, which, in our invention, is advantageously influenced by suitable tuning elements, in optimum of sensitiveness is attained.

In order to utilize the advantages afforded by alternating current as above mentioned, it is advisable to derive the alternating current from a special alternating current generator. In this case a machine generator has great advantages as compared with a valve generator. The frequency of alternating current generated by a machine generator depends almost exclusively on its number of revolutions. If, however, a thermionic valve is employed as generator the frequency is materially influenced by the properties of all circuits connected with the valve. If the body to be tested is changed in the magnetizing coil, the self-induction of that coil alters greatly with the dimensions and the material properties of the body being tested, so that the frequency generated when employing valve-generators would vary within wide limits. When using alternating current machines, however, the frequency does not depend, on account of the inertia of the rotor on the self-induction of the circuit. This self-induction only varies, especially due to the magnetic properties of the generator, the form of the current curve within each period. If the alternating current should be derived from an existing supply source also used for other purposes, there is again no convenient possibility of influencing the frequency and the curve form of the current per period as desired. Besides disturbances may be introduced in to the measurement by such outside consumers. It is, therefore, best to employ a special alternating current generator, which besides is preferably controlled by a speed governor by means of which not only the number of revolutions required can be adjusted but also be kept constant within extremely small margins.

Although an alternating current machine when properly designed may generate almost sinusoidal current, the latter is distorted by the iron of the body to be tested. Thus very severe current variations may occur within every period which may detrimentally react upon the operation of the generator by their recurrent nature. In order to control the reaction of such current shocks and voltage peaks, which, at great amplitudes of the magnetizing current may damage the generator or affect its operation, it is advisable to interpose a sufficiently large self-induction free of iron between the generator and the magnetizing winding on the body, as will be explained later. By means of additional tuning and control elements (inductive, capacitive and ohmic resistances) the flow of the current can be influenced at will. At least one of these tuning elements should be made variable, in order to compensate for the variable iron section of the body to be tested. It may furthermore be advisable to connect this variable tuning element to an automatic regulator which undertakes the tuning as soon as the intensity of the current is altered by an alteration in the iron section or in the sort of iron. If such a regulator is not provided and if regulating correspondingly by hand does not take place, it may easily occur that the current flowing through the magnetizing circuit assumes too high values, when alterations in the body to be tested takes place.

The use of alternating current for magnetizing purposes offers, as already mentioned, the great advantages of having greater variation possibilities than continuous current. This possibility has previously not been taken advantage of in the few cases where alternating current has been employed for similar purposes. This current was usually derived from available sources, regardless as to whether they were even approximately suitable for testing purposes, such as outlined above with respect to frequency control, tuning and similar novel features embodied in our invention.

Before describing further details it appears proper to examine, with the aid of short calculations, the conditions in the test-circuit as only, after knowing the sort of expected optima of adjustment, it will be possible to adjust these optima for testing. In order to take advantage of the tuning possibility, the circuit employed for the test possesses a certain self-induction L (including the self-induction of the test-coil), furthermore a certain capacity C and an ohmic resistance R. They form a complete electric oscillatory-circuit. It is assumed that the corresponding reactances of the indicator instrument, if the latter lies on the circuit, are contained in the values of the oscillatory-circuit L, C, and R. An important progress is already made by the use, in our invention, of an oscillator as previously described, which by tuning to resonance can bring the indicator to a favourable deflection. Tuning alone, however, is not sufficient if it consists merely in varying one of the values L, C or R of the oscillatory circuit—say of the capacity—where at first may be observed an increase of the current-intensity in the test-circuit, in one sense until, on further alteration in the same sense, a decrease of the current intensity is observed, i. e. until a relative maximum of the current intensity is reached. We shall show that the relative maximum is generally not simultaneously the absolute maximum which can be obtained with the same tuning circuit (see Fig. 4).

If, for example, the alternating current generator generates sinusoidal oscillations of the frequency $n$, the magnetic field in the testing generator will nevertheless not alter sinusoidally through the influence of the magnetizing properties of the iron. By retaining the frequency $n$ it will show a flow often varying much from the sinusoidal form. Independently of the intensity variations of the magnetizing field during one period the test coil is, according to the invention, adjusted for homogeneous material so that no component of the magnetization can be measured by the coils, consequently no current appears in the test-circuit. The current appearing in the test coil and the test circuit for non-homogeneous material (deviation in the permeability of the materials, its conductibility, its dielectric constant, its density, its elastic properties and its direction of casting and treatment from the normal value for the medium) may be assumed proportional in its temporary flow to the normal value of the induced magnetic field. If the test circuit is now tuned to the frequency $n$ of the magnetizing alternating current, only that part of the magnetization component corresponding to the fundamental frequency is filtered by this test circuit. We have found that in many cases this current is smaller than the current which flows when the test circuit is tuned to a certain other harmonic, for instance the $m^{th}$ harmonic of the fundamental frequency, i. e. to the frequency $m.n$. On account of the distortion of the current curve of the sinusoidal form due to the existence of the magnetizable material some harmonic of the fundamental frequency (often not the fundamental frequency itself) will be much more predominant, manifesting itself in an especially strong indicating current of this harmonic in the test circuit. In order to obtain a sensitive indication, we ascertain which frequency is predominant in the induced current and tune the test circuit to this frequency. Only the product of C and L of capacity and self-induction are hereby ascertained. The special value to be given to the capacity and the self-induction depends on the degree of tuning required and the properties of the measuring instrument.

It may be advisable to tune the test circuit to a frequency which is not a multiple of the fundamental frequency, but which has a common divisor (not too small) with the fundamental frequency. In this manner beats can be created in the test circuit. Even if the test circuit does not oscillate with an audible frequency, a combination-frequency can be obtained (according to the methods known in the art of wireless telegraphy) which is easily audible. It is advisable, in this case, to employ a telephone as indicator instrument.

It is assumed that the current flow generated by the alternating current generator is purely sinusoidal with an amplitude A. $i = A \sin 2\pi nt$.

The temporary flow of the current induced by it in the test coil is assumed to be $$i = \sum_{k=1}^{\infty} a_k \sin(2\pi knt + \zeta_k)$$

Among the total number of amplitudes $a_k$ of all the harmonics $k$, the amplitude $a_1$ will hereby usually not have the highest value, but the amplitude $a_N$ of the $N^{th}$ harmonic for $N > 1$ (see Fig. 4 for $N = 3$). Therefore the test circuit should be tuned to this harmonic.

It will hereby be observed that it is not advisable to stop tuning when the first relative maximum is observed during the variation of a tuning element (such as the capacity). For when, for example by reducing the capacity, the natural frequency of the oscillating circuit increases, we shall arrive successively at a fundamental frequency $n$, at the octave (of the frequency $2n$), at a quint of this octave (of frequency $3n$) and would observe at some of these harmonics a larger deviation of the current intensity than for neighbouring values of the natural-frequency which do not correspond to a harmonic. Nevertheless it will again be necessary to pick out that with the greatest deflection.

Though tuning to greatest sensitiveness is carried out, it may occur that the current intensity is too small to be measured directly. Consequently, according to the invention, and as will be described with reference to Figure 1, an amplifier is connected with the test circuit. Such an amplifier should be designed however with respect to its sensitiveness so that is responds only beyond a certain minimum threshold value. By such a design it becomes possible to avoid amplification of currents due to all those defects of the material which are so small that they are not worth while observing. They are thus completely eliminated from the test observations, while all defects in which the inductive reaction lies above a certain threshold value, are amplified as required. A triode, in which the sensitivity threshold value can be adjusted by suitably selecting the grid or the anode potential may be used as amplifier for this purpose.

Our invention is illustrated in the accompanying drawings which represent diagrammatically examples of forms in which our invention may be reduced to practice.

Referring to these drawings Fig. 1 represents the entire arrangement of an apparatus for testing a cable 1 at a transverse section 2—2 with an arrangement for recording the test results.

Fig. 2 represents a special form of test coil 3 in order to measure only one radius of the section 2.

Fig. 3 represents an acoustic reception arrangement for the test results in an apparatus according to Fig. 1.

Fig. 4 represents a graph showing the variation of the current in the oscillating circuit 4 of Fig. 1 as a function of the natural frequency of this oscillating circuit.

In Fig. 1 the magnetizing arrangement is principally shown to the left of the cable 1, the recording arrangement to the right of the same cable. An alternating current generator 6 may supply to the terminals 7 and 8 alternating current at well audible or acoustic frequency, say about 500 periods. The speed of the alternating current generator is maintained constant by a centrifugal governor indicated at 9. By altering a resistance 10 the generator speed and thus the frequency of the generated alternating current can be adjusted at will. The rotor 11 of the alternating current machine is driven by a direct current motor 12 or by an ordinary line wire alternating current motor, say at 50 periods. For exact testing it would be most unfavourable to use an A. C. of the same frequency—such as 50 per sec.—which is used for other purposes in the neighbourhood or a small harmonic of it. The testing circuit would be too much influenced by neighboring stray fields. The conductor leads from the terminal 7 to the magnetization coils 13 and 14, which are wound or pushed on the cable to be tested 1 and which are arranged symmetrically to the plane of section 2. They are preferably constructed in such a way that they are laid round the cable later, for this purpose they can each be made of two halves inside of one another. The current flows from the coil 14 over a protecting inductance coil 15 back to the other terminal 8 of the alternating current generator. The terminals 7 and 8 are besides bridged by a self-induction 16 and a condenser 17 in series with it. If in the oscillatory circuit, including generator 6, inductance 16 and capacity 17, the generator acts with respect to the frequency of the oscillations generated by it respectively more as self-induction or as capacity, the capacity 17 or the self-induction 16 respectively will be kept correspondingly small. It thus is possible to control the lag or lead of the generator or the effect thereof. The self-induction 15 is adjustable in such a manner by means of a governor 18 which may for instance be a hydraulic one not illustrated here, that the magnetizing current acts on the governor by a shunt 19 and for greater intensities puts into circuit corresponding larger parts of the self-induction 15 or a special resistance.

The continuous or low frequency alternating current line feeding the motor 12 is simultaneously connected to the coils 13 or 14 respectively by two conductors 20 and 21 so that these coils simultaneously receive an additional magnetization of lower frequency. This expedient is employed, because sometimes it appears desirable to use an alternating current magnetization with superimposed continuous current or another lower frequency alternating current magnetization. In this manner not only the penetration of the magnetization into the material can be favorably influenced, but by altering the superimposed magnetization, differences in the magnetic resistance of the different bodies tested may be compensated. Preferably the same coil supports respectively coils or portions thereof are employed for both sorts of magnetization as will appear from Figure 1. When, however, employing parts of the same coil-winding for both magnetizations, blocking elements such as blocking condensers or choke coils (not shown in Figure 1) should be inserted into one or the other circuits in order to prevent the action of one current supply system on the others.

Around the cable portion 2 under observation is placed the test coil 22 composed of several equally dimensioned windings, of which each has its winding plane arranged parallel to the axis of the body for instance the cable, to be tested, however the centers of the individual windings being all spaced apart at equal angles, so that the coil system completely surrounds the test body 1 at its test section 2. Both ends of the test coil or system of coils form together with the condenser 23, the resistance 24 and the coils 25, 26 the test circuit 4. It is important, when making careful observations according to our invention that the coil 22 with reference to its inductive action also lies symmetrically to the test section 2. The condenser 23, the ohmic resistance 24 and the inductive resistance 25 in the test circuit 4 are variable. The coil 26 represents the primary side of a transformer, the secondary coil 27 of which is connected to the grid 28 and the cathode 29 of a triode 30, serving as amplifier. The anode 31 of this tube 30 is connected to the cathode 29 over a battery 32 and contains in this connection a galvonometer 33 and, according to the frequency of the oscillations in question and the character of the galvanometer used, a rectifier, the work of which in the present case is taken over by the thermionic valve 30. The hand 34 of the galvanometer shows by the amount of deflection from the zero position the amount of influence which the defective portion 56 in the section 2 of the test body exerts. The hand 34 of the galvanometer can simultaneously record its deflection on a recording arrangement in which a recording tape 5 passes in longitudinal direction under the point of the hand, while a metallic plate 35 on the other side of the recording strip 5 is continually loaded to a high potential with respect to the hand 34, so that, at regular intervals an electric spark from the point of the hand punctures the recording strip and thus records the position of the hand point on the tape. This manner of working a recording arrangement has the special advantage that the galvanometer hand is not called upon to expand energy for the recording, as would be the case, if the hand were connected to a pencil. This particular manner of recording does, however, not form part of the subject matter of the present application and is old in the art. One of the features of our invention is rather the use of such a recording arrangement for the purpose of material tests, in which sometimes only small indicating currents are at the disposal in order to save amplification. Our invention refers furthermore in this respect also to the particular connection of the recording strip 5 with the test cable 1 to bring about their coincidental movement. The test cable 1 runs between two pairs of rollers 36, 37, arranged on opposite sides of the cable and one pair at each end of the testing device, the recording strip being similarly arranged between two roller pairs 38, 39. The rollers 37, 38 are coupled to one another (for instance by a belt 40), so that the movement of the cable 1 is transmitted—at a certain ratio, depending upon the relative size of the rollers,—to the recording strip 5, thereby feeding the latter forward at that ratio. The arrows 41 and 42 indicate respectively the directions of movement of the recording strip and the cable. The recording strip 5 should be held taut between the two pairs of rollers 38, 39, and it is also preferable to dispose the galvanometer 33 in front of the strip 5 so that its hand 34 in the zero position points towards the travelling direction of the recording strip 5. The rollers 38, 39 are shown in the diagram on the edges of the strip, merely for clearly showing the rollers. They would in reality be in this illustration on top and underneath the strip.

Fig. 2 shows the cable 1 with a plane spiralformed flat coil 3, symmetrically arranged to the section 2 under observation. If, with the test coil 22 in Figure 1, a defective portion has been observed the fault can approximately be ascertained later, by repeating the test of the section with the coil 3, whereby its approximate depth in radial direction and the approximate radius on which it is located may be determined. For this purpose the cable 1 is turned about its axis during observation. If only one defect 56 exists in the section 2 and it lies near the surface, a maximum deflection will be found, as soon as the test coil 3 lies above the defect 56, i. e. as soon as the radius on which it lies is at right angles to the coil plane. From the ratio of this maximum deflection to the minimum deflection (which is approximately observed after turning the cable 180° on its axis) the depth of the defect can be judged.

Fig. 3 represents, in connection with the cable testing arrangement according to Fig. 1, a serviceable acoustic receiving arrangement, which can either be used together with an optical one represented at the right of Fig. 1 or in its place. The connection may either take place by means of the primary transformer coil 26 of the test circuit 4 (see Fig. 1), or, if the indicated current is to be amplified, by means of a coupling coil lying on the anode side of the amplifier valve 30. The secondary coil 43 of the transformer is connected to a telephone by means of which a tone is directly audible if the natural frequency of the test-circuit 4 is an audible one. If the frequency, however, lies above audibility, the oscillation can, in the known manner, be heterodyned to a beat note of audible frequency. For this purpose the coil 44 of the telephone circuit is connected to a generator circuit 46, composed for example of a three electrode valve 47, the anode 48 of which is connected to the cathode 51 over the self-induction 49 coupled to 44 and over the battery 50, whilst this cathode 51 on the other hand is connected to the grid 53 of the valve 47 by the reaction coil 52. The details, such as the tuned circuits of the tube oscillator system 46 are not illustrated in detail, as they are well known in the art. The oscillator 46 is tuned to a frequency which will heterodyne with the frequency of the observed current so that a beat note is heard in telephone 45. The heating battery for the thermionic cathode 51 can be advantageously replaced by feeding the cathode at the same time with the magnetization current. Generally disturbances can occur when employing an alternating current for heating a three electrode valve. In the present case disturbances need not be feared as the variations at the frequency of the magnetization current are not imparted to the test circuits in a similar manner.

The amplifier valve 30 can accordingly also be fed by the magnetizing current instead of by a heating battery.

Fig. 4 represents the current flow in the test circuit 4 for example if the natural frequency of the test-circuit 4 is altered in any known manner. Let this natural frequency which, with the values of the capacity 23 and the induction 25 and, in a lesser degree, with the ohmic resistance 24, is variable, be altered in any unequivocal way, for example, by keeping the ratio of self-induction and capacity constant. Fig. 4 then shows that the amplitude of the current has a relative maximum for the frequency $n$, that other small maxima for the frequencies $4n$, $5n$ etc. occur, but that the absolute maximum appears for the frequency $3n$, whilst the frequency $2n$ (octave of the fundamental frequency) in our example is not distinctly marked.

When testing the cable with reference to the tuning of the test circuit 4, we proceed as follows:

The cable under investigation is placed into the testing apparatus with a portion which is known to have a defective place. First, exactly similar to cable 1, with respect to cross-section and magnetic properties of the material the standard cable is tested which has a definitely known defective place. Or also the cable 1 to be examined is first tested with rough tuning until a portion is found which has a distinctly severe defect. Then the finer tuning and examination method above described is applied to this particular defect. Then with the data thus obtained other places may be found in the cable which have similar or lesser defects.

When carrying out the fine measurements for a certain defective cable portion, the capacitative, inductive and ohmic resistance elements of circuit 4 are adjusted first to the most favorable values with the view of adjusting the frequency of circuit 4 equal to the magnetization frequency. Then, later, the best adjustments are made for the higher harmonic frequencies ($2n$, $3n$ etc.) and then the optimum values are compared. Then the final adjustment is made for that value at which an absolute maximum of current intensity is indicated.

We can proceed in the same way, but under simultaneous consideration of the non-harmonic intermediary frequencies, if, in order to avoid a special heterodyne circuit 46 we wish to already generate beats in the circuit 4 (eventually with a high frequency $n$ as fundamental frequency and an audible frequency as combination frequency).

We claim:

1. Arrangement for testing a magnetizable object, comprising magnetizing coils disposed on the object, means for supplying alternating current to said coils, a test coil system surrounding the body at the test point and consisting of a plurality of loops, each having its winding plane in parallel to the surface of the object at the test point, and all loops being connected in series and a test circuit arrangement including said test coil for observing the currents induced in said test coil, due to faults in the structure of the body.

2. Arrangement for testing a magnetizable object, comprising magnetizing coils disposed on the object, means for supplying alternating current to said coils, a test coil system surrounding the body at the test point and consisting of a plurality of loops arranged around the body, each having its winding plane in parallel to the longitudinal axis of the test object and all loops being connected in series, and a test circuit arrangement including said coil system for observing the currents induced in said system, due to faults in the structure of the body.

3. Arrangement for testing a magnetizable object, comprising magnetizing coils disposed on the object, a variable frequency alternating current machine for supplying alternating current to said coils, and having tuning elements disposed across its output terminals, a testing coil having its winding plane in parallel to the surface of the test object at the cross-section to be tested, and a test circuit arrangement including said test coil for observing the currents induced in said test coil, due to faults in the structure of the body.

4. Arrangement for testing a magnetizable object, comprising magnetizing coils disposed on the object, means for supplying alternating current to said coils, a testing coil having its winding plane in parallel to the surface of the test object at the cross-section to be tested, and a test circuit arrangement including said test coil for observing the currents induced in said test coil, due to faults in the structure of the body, and means for supplying direct current through portions of said magnetizing coils for superimposing a direct current magnetization upon the alternating current magnetization produced by said magnetizing coils.

5. Arrangement for testing a magnetizable object, comprising magnetizing coils disposed on the object, a variable frequency alternating current machine for supplying alternating current to said coils, a testing coil having its winding plane in parallel to the surface of the test object at the cross-section to be tested, and a test circuit arrangement including said test coil for observing the currents induced in said test coil, due to faults in the structure of the body and a variable air core inductance coil in series with said generator and said magnetizing coils, and means responding to current variations in the magnetizing circuit for varying the inductance of said coil.

6. Arrangement for testing a magnetizable object, comprising magnetizing coils disposed on the object, means for supplying alternating current to said coils, a testing coil having its winding plane in parallel to the surface of the test object at the cross-section to be tested, and a tunable testing circuit including said test coil and being capable of oscillating at a frequency different from the frequency of the magnetizing alternating current, and means for observing the oscillatory currents generated in said test circuit due to faults in the structure of the test body.

7. Arrangement for testing a magnetizable object, comprising magnetizing coils disposed on the object, means for supplying alternating current to said coils, a testing coil having its winding plane in parallel to the surface of the test object at the cross-section to be tested, and a tunable testing circuit including said test coil and being capable of adjustment to resonance with a harmonic of the magnetizing alternating current frequency, and means for observing the oscillatory currents generated in said test circuit due to faults in the structure of the test body.

8. Arrangement for testing a magnetizable object, comprising magnetizing coils disposed on the object, means for supplying alternating current to said coils, a testing coil having its winding plane in parallel to the surface of the test object at the cross-section to be tested, and a test circuit including said test coil, in which coil currents are induced, due to the faults in the structure of the body, and an amplifier connected with said test circuit for amplifying said test currents and means for observing said amplified currents, said amplifier being sensitive to currents derived from said test circuit only above a desired current threshold value, to permit the observing of faults only above a desired magnitude.

In testimony whereof we affix our signatures.

HELMUT CHAPPUZEAU.
OTTO EMERSLEBEN.

CERTIFICATE OF CORRECTION.

Patent No. 1,782,462.  Granted November 25, 1930, to

HELMUT CHAPPUZEAU ET AL.

It is hereby certified that error appears in the above numbered patent requiring correction as follows: Page 1, in the heading to the specification, line 6, for Serial No. "188,752" read 118,752; and that the said Letters Patent should be read with this correction therein that the same may conform to the record of the case in the Patent Office.

Signed and sealed this 6th day of January, A. D. 1931.

(Seal)

M. J. Moore,
Acting Commissioner of Patents.